United States Patent [19]
Gurinov et al.

[11] Patent Number: 5,385,336
[45] Date of Patent: Jan. 31, 1995

[54] METHOD AND APPARATUS FOR TORCH WORKING MATERIALS

[75] Inventors: Alexander V. Gurinov; Vladimir N. Kostritsa; Igor' V. Petrov; Valeryi F. Sukhostavets, all of Dmitrov, Russian Federation

[73] Assignee: Narwhal Ltd., Dmitrov, Russian Federation

[21] Appl. No.: 167,750

[22] Filed: Dec. 15, 1993

[51] Int. Cl.$^6$ ............................................. B23K 7/00
[52] U.S. Cl. ........................................ 266/74; 266/48
[58] Field of Search .................. 266/48, 74; 148/194

[56] References Cited

U.S. PATENT DOCUMENTS

| | | | |
|---|---|---|---|
| 3,246,115 | 4/1966 | Johnson | 266/48 |
| 3,463,601 | 8/1969 | Childree | 266/48 |
| 4,057,705 | 11/1977 | Cockrum et al. | 266/48 |

FOREIGN PATENT DOCUMENTS

00155146 12/1963 U.S.S.R. .
00924370 4/1982 U.S.S.R. .

*Primary Examiner*—Scott Kastler
*Attorney, Agent, or Firm*—Dykema Gossett

[57] ABSTRACT

Torch apparatus (20) for working a material comprises a mixer (28) with a central body (32) placed inside the inner space (30) of the mixer, and a torch tip (22) with a combustion chamber (24) and a nozzle (26). Fuel and oxidizer components are delivered into the mixer, mix with each other into a propellant and interact with the central body which includes a spark plug (60) in one of embodiments. The central body acts to control thermodynamic parameters of the propellant mixture to be set to fire from a spark discharge and burnt under high pressure, forming a supersonic high temperature gaseous jet acting upon the material. Also disclosed is a method in which the apparatus is to be implemented and comprising steps of providing a fuel and an oxidizer, mixing the fuel with the oxidizer, burning the propellant mixture under high pressure and forming a supersonic high temperature nonoverwidened gaseous jet out of products of combustion to act upon the material.

30 Claims, 3 Drawing Sheets

METHOD AND APPARATUS FOR TORCH WORKING MATERIALS

FIELD OF THE INVENTION

The invention relates to torch working materials and is intended particularly for flame and erosional cutting metals and building materials (cement, reinforced concrete, bricks and brickwork, plastics, etc.) and their compositions; flame drilling in and surface working of above-mentioned materials, including working of welds, rectifying surface defects, engraving legends and images, vitrification of cement and concrete, etc.

BACKGROUND OF THE INVENTION

Numerous methods and apparatus are known in the art which involve the use of a torch for working materials. The use of flame cutting has the disadvantage that it is only applicable to easy-to-oxidize materials such as structural steel. Another type of torch cutting, known as flux-injection cutting is undesirable from the stand point that it creates flux material pollution in the form of fine articles of aluminum, iron, sand, etc. Plasma cutting, yet another type of cutting, is limited in terms of its effectiveness for cutting non-metallic materials (non-conductors of electrical current), and limited effectiveness in cutting materials having a thickness more than 40 mm. Moreover, high temperatures in the working area (more than 10,000° C.) result in intensive sublimation of the material being worked and its oxides which makes this method ecologically detrimental.

Also known in the art is a method of breaking down rocks with the aid of high temperature supersonic jet as disclosed in USSR Author's certificate #924370, Int. Cl. E 21 C 3716, 1982. However, this method is unsuited for torch working different materials since it has no provisions for changing jet parameter values.

A method and apparatus are also known in the art for flame cutting steel which are disclosed in USSR Author's Certificate No. 155146, Int. Cl. F23D 14/46, 1963. This method comprises providing a fuel and an oxidizer, mixing the fuel with the oxidizer into a propellant, burning the propellant mixture under high pressure, forming a gaseous jet of products of combustion, and acting upon the material with the gaseous jet. The apparatus used to practice this method contains a cutting head and a grip accommodating tubes for oxygen and fuel supply. The cutting head comprises a mixer including a housing, a perforated spacer, and a torch tip. Passages are formed in the housing to deliver propellant components to two rows of through openings concentrically located on the spacer-for oxygen and fuel delivery, and to the central opening for delivery of cutting oxygen. An inner space of the torch tip includes a combustion chamber where propellant components are mixed, burnt and evaporated.

The disadvantage of the flame cutting method and apparatus mentioned above is low effectiveness in cutting a number of materials. Specifically, it was difficult to work reinforced concrete and brickwork; aluminum alloys forming refractory oxides; oxidation-resistant products as stainless steel; pig iron containing high amounts of silicon and forming slags which are difficult to carry away from the cutting area.

The disadvantage mentioned above results from low efficiency in burning the propellant components (the fuel and the oxidizer) which in turn results from arranging the openings for delivery of fuel and oxidizer in the same plane of the section of the apparatus. As a matter of fact, the effectiveness of mixing the propellant components immediately depends on the precision in making and mutual arranging of the sloping openings for the fuel and oxidizer. It is only in an ideal case where the openings are manufactured absolutely precisely, that the fuel and oxidizer flowing out of them would collide at a predetermined point. In practice, however, variations always exist in the angles of slope of the openings, in their spacing relative to the apparatus axis of symmetry, in their angular arrangement at the spacer plane, in the geometry of front and rear edges of the openings, as well as some degree of roughness and soiling of their inner passages, inhomogeneity of speed field in ring-shaped bores, etc. Under these circumstances, mixing of the propellant components occurs under imperfect conditions, and completeness of combustion of the propellant within restricted space of the tip is not high.

There is also a loss of the propellant components upon their firing, and pulling a torch into the tip (the combustion chamber). Time is to be spent for forming a supersonic jet outflowing from the tip which needs mixing propellant components, firing the propellant mixture, and regulating flame parameters in order to ensure propagating of the flame edge back into the tip. All these operations necessitate definite skills and qualification of a cutter. Improper performing them may result in either flame-out and flame failure or flame edge penetrating into the mixer and popping that causes the flame to have to be extinguished. Such loss may have a significant bearing on effectiveness of the apparatus, especially where the process of cutting a structure (such as an aircraft) may necessitate moving therealong, with the torch burner being turned on and off.

It is therefore an object of the invention to provide new method and apparatus with enhanced effectiveness in torch working materials of different properties and width which results from reduction of propellant (fuel and oxidizer) consumption at the starting-up moment owing to decrease of starting-up time.

The method of torch working materials according to the present invention comprises the steps of providing a fuel and an oxidizer, mixing them with each other into a propellant, burning the propellant mixture under high pressure, forming a supersonic nonoverwidened gaseous jet out of products of combustion and acting upon the material with the gaseous jet. A speed ratio of the gaseous jet speed (v), acting upon the material, to the speed of sound (a) in the jet is to be chosen in the range of 1.1 to 4.8; a temperature ratio of the jet temperature ($T_c$) to the melting point ($T_m$) of the material is to be chosen in the range of 1.2 to 4.5. Additionally, the factor ($\alpha$) of the oxidizer excess relative to a stoichiometric ratio of propellant components is to be chosen in the range of $$3.4 \leq \alpha \leq 4.9$$

for easy-to-oxidize materials, and in the range of $$0.44 \leq \alpha < 3.4$$

for non-oxidizable materials and materials forming refractory oxides. The above mentioned factor $\alpha$ is a fraction with a real mass ratio of the propellant components in the numerator and the stoichiometric ratio of the propellant components, providing complete combustion thereof, in the denominator.

One important facet of the method lies in using a supersonic, concentrated, high-temperature (up to 4000° C.) jet. In this connection, three factors have an effect on the material. Specifically, they are: a temperature action resulting in melting the material down; a chemical attack by the chemically active jet for oxidizing the material; and an erosional action consisting in blowing the melted material along with its oxides out of the working area by the jet head.

It is the cooperative action of the basic elements of the jet, namely, forming the jet by burning fuel (specifically kerosene-gasoline or ethylmethyl alcohol) and oxidizer (specifically oxygen) at elevated pressure as compared with the ambient pressure surrounding the material;

nonoverwideness of the jet;

the jet speed and temperature ranges; and ranges of the oxidizer excess factor (chemical composition of the jet), that contributes to the above-mentioned factors and makes accomplishment of the object of the invention possible.

As used herein, the term "nonoverwideness" is intend to mean that the jet as delivered to the working area possesses a static pressure that is equal to or greater than the ambient pressure so that it is sufficiently concentrated to be highly penetrating and hence effective. It is understood that the various feature dimensions and ratios, and specific geometries are to be selected so as to produce a "nonoverwidened" jet having this characteristics.

At the same time, it has been established analytically and experimentally that:

at falling outside the upper limit of the v/a range, the gas flow approaches the hypersonic one. The technical implementation of apparatus with such kind of gas flow is complex and unsuitable economically.

At falling outside the lower limit of the v/a ratio, the supersonic jet flow becomes unstable which results from flow nonideality and technological imperfectness of making a gas dynamic path. The unstableness of supersonic flow considerably decreases the effectiveness of the process.

Using a supersonic jet having the temperature ratio $T_c/T_m$ less than 1.2 decreases the effectiveness of torch working, and it may even fall down to zero because of heat loss due to heat conduction of the material and natural convection. Falling outside the upper limit of the chosen $T_c/T_m$ range (beyond 4.5) may cause volatilization of the material being worked, and, hence, discharge into the open air of fumes of such unhealthy steel alloy addings as chromium, molibdenum, berillium, nickel, etc., which may result in ecological impurity of the process, and the necessity of taking certain arrangements to protect the personnel and environment. Eventually, that will lower effectiveness of the process.

Maintaining chemical composition of the jet variable for different easy-to-oxidize and oxidation-resistant materials within the above limits enables to effectively cut and work the relevant materials and structures therefrom, with the least consumption of the propellant components possible.

According to the present invention, an apparatus (which is hereinafter also referred to as a burner) comprises a cutting head containing a torch tip and a mixer defining in cooperation an inner space of the cutting head, and a grip, including pipelines with flow control elements, for delivery of an oxidizer and a fuel from their sources. The mixer has openings connected, on one side, with the pipelines, and with the inner space of the cutting head, on another side. The mixer includes a housing having an inner space communicating with an inner space of the torch tip, the openings in the housing of the mixer being formed on different levels with respect to flow. The opening for fuel delivery is formed in a side part of the housing of the mixer and located downstream in respect to the opening for delivery of the main oxidizer. The ratio of the hydraulic diameter $d_{h\text{-}fo}$ at the outlet from the opening for fuel delivery into the inner space of the mixer to the hydraulic diameter $d_{h\text{-}mis}$ of a flow section of the inner space of the mixer at the point of the introduction the fuel into the inner space of the mixer is to be assigned within the range of 0.03 to 0.5.

By hydraulic diameter $d_h$, the term well-known to those skilled in the art of fluid mechanics, the definition $d_h = 4S/P$ is meant, where S is flow section area of a passage, and P is its wetted circumference. In particular case of a circular opening, its diameter is obviously the hydraulic diameter of the flow section of the circular opening.

The mixer inner space is provided with a central body axially installed in that space, and hermetically secured in the top opening of the housing, with one end of the central body outwardly projecting from the housing. The central body acts as a unit for controlling thermodynamic parameters of the propellant mixture flow. The central body is activated by a drive cooperating with the part of the central body outwardly projecting beyond the mixer housing.

Effectiveness enhancement of the invention as compared to the prior art results from forming an area of bottom rarefaction beyond the face of the central body located in the mixer inner space. As it is well known to those skilled in the art of gas dynamics, gas flow structure in such area is vortical in its effect. High degree of turbulence of the vortical structure contributes to high homogeneity of the fuel and oxidizer propellant mixture prepared previously upstream. Specifically, it has been experimentally found that the jet concentration, in the case of gaseous oxygen and small fuel drops (less than 40 μm) previously mixed in the mixer inner space, is getting practically equalized due to high extent of turbulence.

The above range of $d_{h\text{-}fo}$ to $d_{h\text{-}mis}$ ratio has been ascertained experimentally. Upon falling outside the recommended range, propellant mixture tends to segregate into layers which reduces effectiveness of the apparatus and increases a probability of its failure as a result of the central body or housing outburning.

Falling outside the lower limit of the range corresponds to an increased fuel momentum relative to an oxidizer momentum that results in fuel concentrating around the central body, distorting propellant mixture forming process, and eventually outburning of the central body face part.

Falling outside the upper limit of the diameter ratio corresponds to a reduced fuel momentum as to oxidizer momentum. In consequence, the fuel concentrates by the inner surface of the mixer, scheme of propellant mixture forming gets distorted again, and outburning of the mixer housing becomes possible.

The central body of the apparatus at issue provides controlling thermodynamic parameters of the fuel and oxidizer propellant mixture, along with participation in the very process of formation the propellant mixture. Those skilled in the art of fluid mechanics are cognizant of speed, pressure and temperature of a flow being its main parameters. These are the very parameters defining effectiveness of the process of torch working materials. To control these parameters with the help of the central body is proposed by means of supplying additional energy through the central body to the flow, either changing its speed field, or introducing an additional mass of a gas into the flow, or both.

With these and other objects and advantages in view, the present invention will be clearly understood from the ensuing detailed description in connection with the accompanying drawings.

DESCRIPTION OF PREFERRED EMBODIMENTS

Referring now to the drawings, and more specifically to FIGS. 1–7, apparatus 20 for torch working materials according to the invention comprises a torch tip 22 with a combustion chamber 24 and a nozzle 26, a mixer 28 with an inner space 30, a central body 32, and openings 34 and 36 for oxidizer and fuel delivery respectively, as well as a pipeline 38 for delivery of an oxidizer, and a pipeline 40 for delivery of a fuel.

Figure 11:
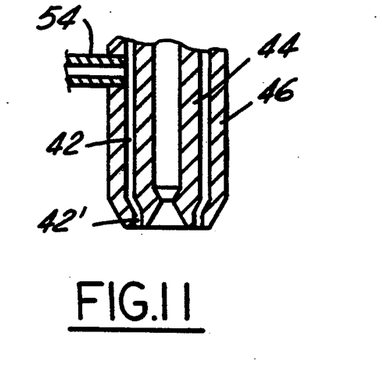
FIG. 11 is a diagrammatic sectional view of a tip modified in comparison with that shown in FIG. 2.

Shaping the tip inner space as the combustion chamber, where a propellant mixture of fuel and oxidizer volatilizes, burns and is brought up to supersonic speed, ensures formation of a high-temperature gaseous jet. torch tip 22 may have an inner space 42 formed within its walls for accommodating a coolant in the form of water, antifreeze, compressed gas, etc. In this case (see also FIG. 11), tip 22 contains an inner tip 44 coaxially located inside an outer cooling case 46. The inner tip is predominantly made of the material with high thermal conductivity, such as copper, bronze, and so on. Outer case 46 is preferably made of aluminum or steel, and has openings 48, 50, for communicating with a cooling medium source (not shown) which can be located at some distance from the cutting area and connected with space 42 via pipelines 52 and 54. Alternatively, inner space 42 can communicate with the open air through a slot 42' at the tip face. This slot 42' is disposed circumferentially with respect to nozzle 26 and may have continuous or discrete (a number of orifices) shape. In operation, a working medium, particularly gas, outflowing from the slot forms an area with a lowered pressure relative to an ambient pressure, thereby lowering the pressure in the working area. Also, torch tip 22 may contain no space for coolant, and be made of refractory materials, such as high temperature steel, ceramics, etc.

A heat transfer means can be provided in the apparatus, for the coolant flowing out of tip inner space 42. The heat transfer can be effected through touching between the pipeline carrying heated coolant away from the tip and the pipelines supplying the fuel and oxidizer to the burner. Enclosing the touching pipelines in a heat conductive case (not shown in the drawings) would intensify the heat transfer. The case can have filling of either heat conductive particles such as granules, shot, or porous insert. Alternatively, it can be potted with a low-melting-point metal.

Openings 34 and 36 for delivery of the fuel and oxidizer to inner space 30 of mixer 28 are connected by pipelines 38 and 40 to sources of the fuel, for example the liquid fuel (kerosene, gasoline or ethylmethyl alcohol, etc.), and the gaseous oxidizer (oxygen, for example), respectively. The sources of the fuel and oxidizer are not shown in the drawings. For better serviceability, these connections with the sources can be made through a first and a second flow control elements including, for example, valves 56 and 58.

Convenient assembling and disassembling of connections in tip 22, mixer 28, central body 32 and pipelines can be ensured by making them as detachable, hermetically sealed joints, the seals used being either "metal-to-metal" ones, or copper, fluoroplastic, or rubber gaskets.

Figures 1, 2:
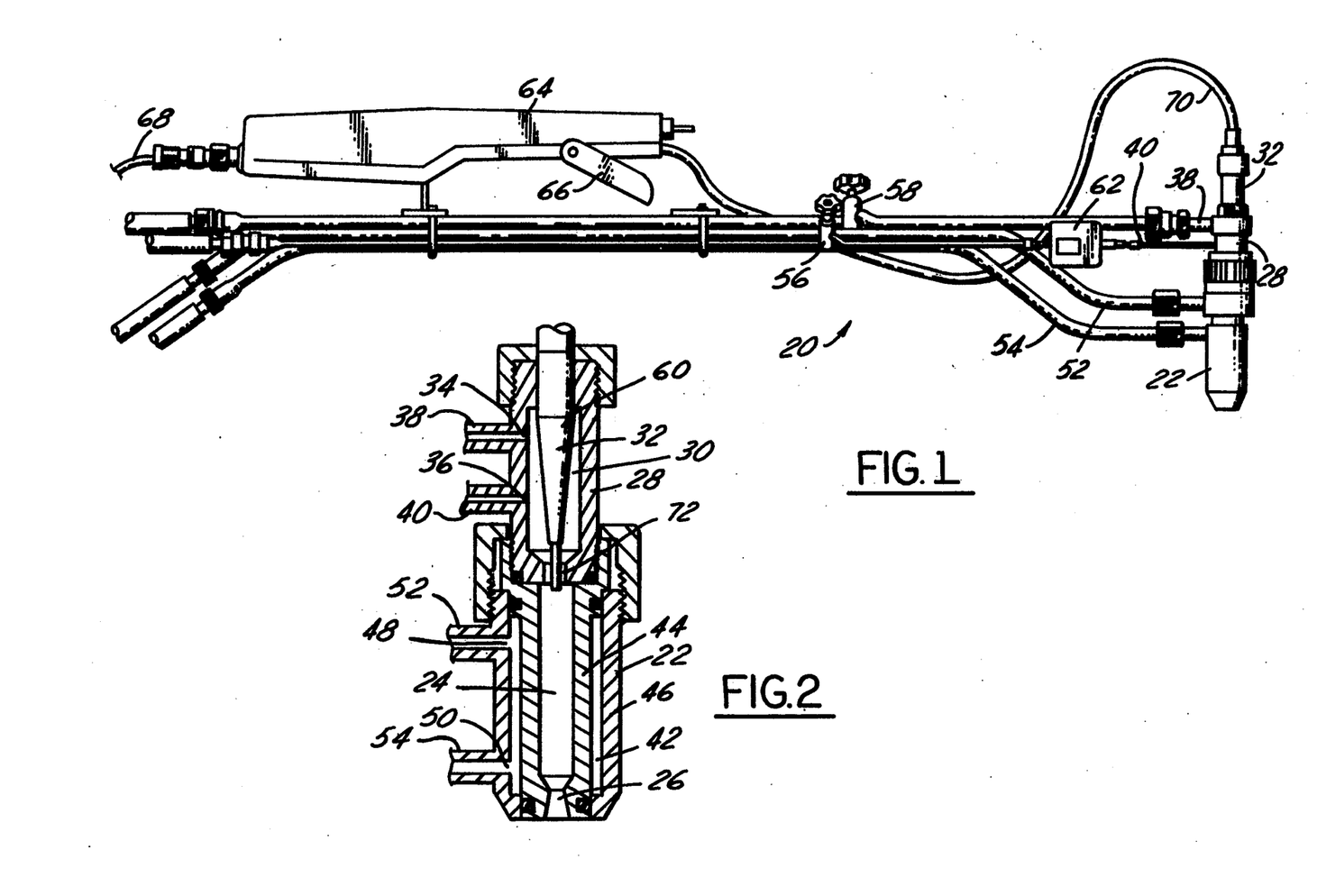
FIG. 1 is a side elevational view of an apparatus for torch working materials according to the invention.
FIG. 2 is a diagrammatic longitudinal sectional view of a cutting head of the apparatus of FIG. 1, with the central body including the spark plug.

FIG. 2 exemplifies central body 32 as including a spark plug 60. For that case, pipeline 40 for fuel supply is equipped with a third flow control element (electric valve) 62 (FIG. 1). It is a control unit 64 that plays drive for commanding electric valve 62 and spark plug 60 during firing. Control unit 64 is equipped with a starting element 66, including for example a button with a clamp (normally open contact), and has an element (not shown) of delay in applying electric voltage to electric valve 62 relative to the moment of applying electric voltage to spark plug 60. Control unit 64 may include an induction coil and an electronic circuit (both not shown) accommodating the delay element. They are intended to control low voltage (for example 12 . . . 36 V) and high voltage (up to 3 kV) supply to electric valve 62 and spark plug 60 respectively. A feeder cable 68 supplies the apparatus with a direct voltage (the above 12 . . . 36 V). A high voltage cable 70 similar to those used in automotive industry for analogous purposes feeds spark plug 60.

There may be a modification of a spark plug functioning as the central body, in which modification (not shown) the central electrod of the spark plug is made hollow and operatively connected to a source of an oxidizer.

Implementation of central body 32 as spark plug 60 and cooperative use of the spark plug, electric valve, and control unit contributes to effective energy conveyance to the flow and its firing, followed by increasing of pressure, temperature and speed of the flow which, in turn, facilitates the start-up of the apparatus within short period of time, specifically in less than 1 s (i.e. practically without loss of time, fuel and oxidizer), as well as its shut-down and refiring at any moment.

Central body 32 and an outlet opening 72 in the mixer can jointly shape the mixer outlet section having minimal hydraulic diameter which favours elevated speed of the fuel and oxidizer propellant mixture. In any position of the central body if it is contoured, made movable or equipped with a movable element (that will be lower described in more detail), it is in the mixer outlet section where there will be the minimal hydraulic diameter. This constriction of the section, along with making the central body of a material having high thermal conductivity, contributes to protection in emergency against passing the flame front inside the mixer. It is appropriate to mention that the central body is recommended to be made of the materials such as copper, brass, chromium bronze, ceramics, some kinds of stainless steel, etc., admitting contact with oxygen.

Successful and effective start-up of the apparatus can also be performed without the spark plug, specifically through controlling field of speeds of the fuel and oxidizer propellant mixture flow. To this end, in another modification (FIG. 3) of the apparatus, central body 32 is made movable, and a part 74 of its surface, as well as a subtending part 76 of the mixer inner surface are contoured in such a way that a longitudinal displacement of the central body, upon action on a drive that may include a head 78, results in changing of the hydraulic diameter of mixer inner space 30 in flow sections that are no higher than that with opening 36 for fuel delivery. The shaping of the central body and mixer inner space can be performed so as to change diameters of these parts of the apparatus, for example to diminish them downstream, according to an elementary function. For the simplest case, parts 74 and 76 could be formed tapered. At the same time, it seems expedient to keep the hydraulic diameter of the mixer outlet section constant, after it has been changed in the course of the propellant mixture forming process with the help of the central body. For that purpose, an end portion 80 of central body 32 (FIG. 3) is formed cylindrical.

To achieve a similar result without using movable elements inside the apparatus, mixer 28 is provided with an additional inlet opening 82 (FIG. 4) for the oxidizer, located upstream in relation to the main opening 34. Connection of openings 34 and 82, through tubes 84 and 86, with pipeline 38 to the oxidizer source (not shown) is performed by means of a flow direction switch, specifically an angle cock 88, redistributing the oxidizer flow rate between the main and additional openings. At the length of the mixer between sections with the main and additional openings for oxidizer delivery, central body 32 is formed as a swirler, preferably in the form of an auger 90.

Figure 5:
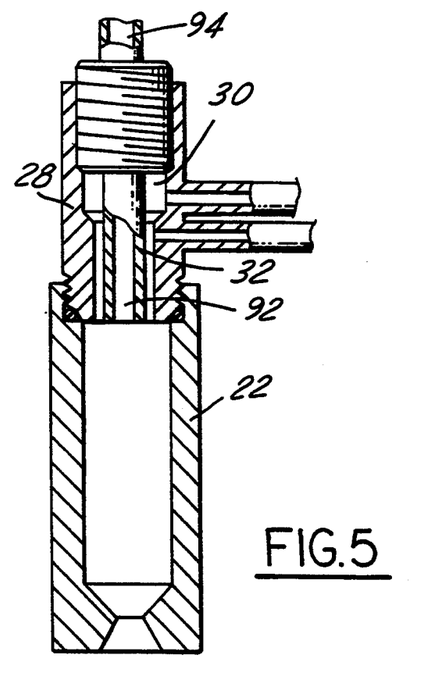
FIG. 5 is a diagrammatic sectional view of another embodiment of a mixer in comparison to that shown in FIG. 3, with a hollow central body.
Figure 6:
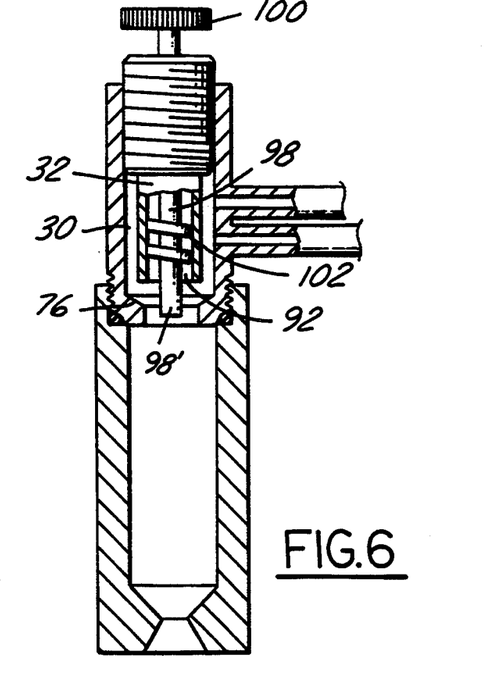
FIG. 6 is a diagrammatic sectional view of one more embodiment of the mixer in comparison to that shown in FIG. 3, with the hollow central body and a swirler therein.
Figure 7:
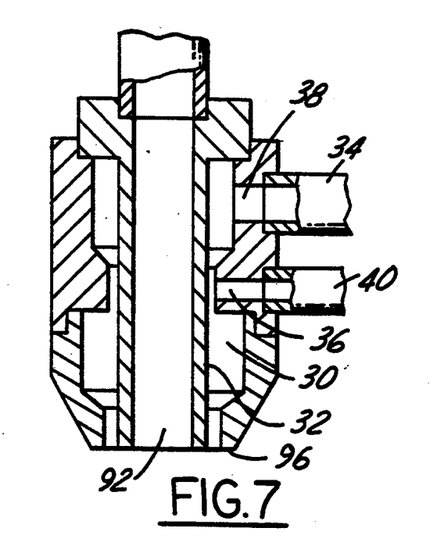
FIG. 7 is a diagrammatic sectional view of still another embodiment of the cutting head according to the invention.

FIG. 5, 6 and 7 show other embodiments of the apparatus where central body 32 is made stationary and hollow, with a longitudinal passage 92 therein.

In FIGS. 5 and 7, passage 92 is connected, through a flow control element (not shown), with an oxidizer supply pipeline 94, and further with the source of the oxidizer (not shown). The configuration in FIG. 5 allows the flow inside the burner to be enriched with an additional amount of the "cutting" oxidizer and to control flow rate, speed and measure of content of the oxidizer in the gaseous jet flowing out of the burner. The structure shown in FIG. 7 has central body 32 with passage 92 arranged along the whole length of mixer 28 and tip 22, down to a cut-off 96 of the latter. With such a structure, burning can take place outside the tip that lowers its complexity since allows to make the tip as volatilization, rather than combustion, chamber. For the case, torch tip 22 ia made heat conductive—of brass, chromium bronze, and so on. Initially, the torch tip is heated up from an external source. A need for the heating falls away when a working temperature has been attained. Because of natural convection and radiation, a part of the heat resulted from combustion of the propellant component mixture is transferred to the torch tip, and then to the volatilization chamber, for heating up and volatilizing the propellant mixture. Here, the outflow is undersonic. Such an apparatus can be successfully used for torch working carbon steel.

In the embodiment of FIG. 6, a movable element 98 is provided longitudinally placed inside central body 32. Movable element 98 is controlled by a drive 100 which is analogous to drive 78 used for the embodiment shown in FIG. 3. It also has a swirler 102 similar to auger 90 shown in FIG. 4, and a continuation 98′ beyond auger 102. Part (not shown) of the surface of movable element 98 may be contoured (tapered for the simplest case), as well as a subtending part of the mixer inner surface (not shown).

For additional enhancement of propellant mixture forming, by means of better turbulizing the propellant components, there provided vortex-favorable knurling of marks or thread with different profile and helical path on the inner surface of mixer 28 or/and on the outer surface of central body 32 (not shown). Turbulization of the flow in a slot passage between the central body and the mixer body wall improves mixing the fuel and the oxidizer into the propellant.

The area of the mixer having minimal section can be formed with a pervious insert, such as a disc secured between the mixer outlet face and the part of the tip contacting and matching same. The pervious disc is not shown in the drawings, it's method of placing, however, being obvious upon looking at FIGS. 1, 3–6. The disc can be made, for example, of heat conductice porous pervious material such as porous sintered copper, bronze, brass, steel, and similar powders; of a stack of metalic gauzes such as a honeycomb—a metalic disc having passages throughout the volume that go in different planes and cross each other, etc. Also, this insert can be formed with an opening for the central body or its movable element. Where the central body includes the spark plug, the side surface of that opening must be electrically isolated. If the insert does not have the opening and the central body, if made movable, partly covers the pervious insert area, it will mean a change of the hydraulic diameter. The pervious insert contributes to speed increase inside the disc and equalization of the mixer outlet speed field, as well as to heat transfer within the disc which effectively prevents flame front from finding its way into the mixer.

Figure 8:
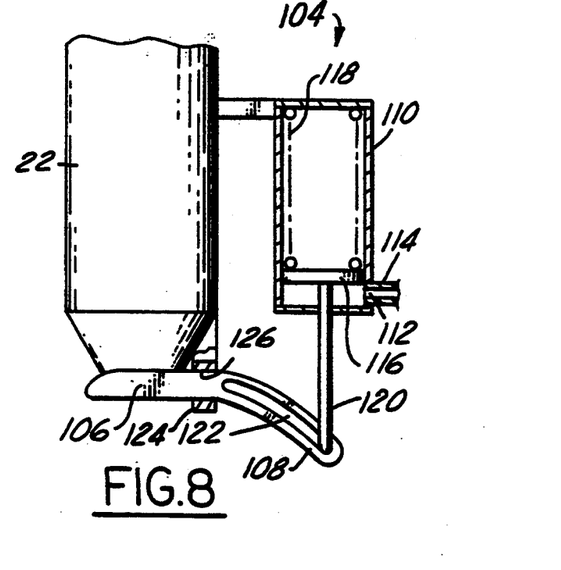
FIGS. 8 and 9 are diagrammatic views of a fragment of the cutting head of FIG. 3 modified for underwater torch working, in its close and open positions, respectively.
Figure 9:
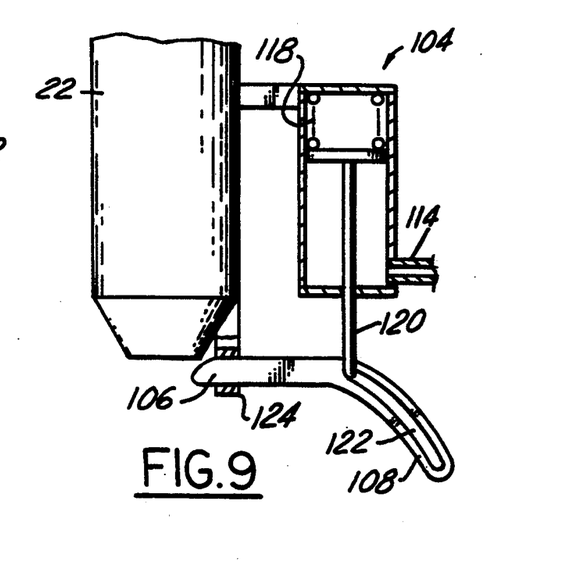

As was mentioned above, the apparatus according to the present invention is capable to carry out torch cutting under water. For this embodiment, the burner is equipped with a protective element 104 shown in FIGS. 8 and 9, providing water to stay out of the tip and mixer inner spaces. Protective element 104 comprises a blank cover 106 with a curved tail part 108, a cylinder 110 with an opening 112, and a pipeline 114 for applying a positive pressure to cylinder 110 through opening 112. Cylinder 110 contains a piston 116 spring-loaded with a spring 118, and a piston rod 120 entering a slot 122 in curved tail part 108 of blank cover 106. The latter is also supported by a pin 124 attached to tip 22 and having a pilot hole 126 to let blank cover 106 in. Pipeline 114 can be connected either with the pipeline for oxidizer delivery to the burner, or with the pipeline for delivery of the coolant such as compressed gas.

Upon applying pressure into cylinder 110, piston 116 with rod 120 move up shifting blank cover 106 to the right (FIG. 9) whereby uncovering the nozzle. Alternatively, blank cover can be made rotatable (not shown).

Figure 10:
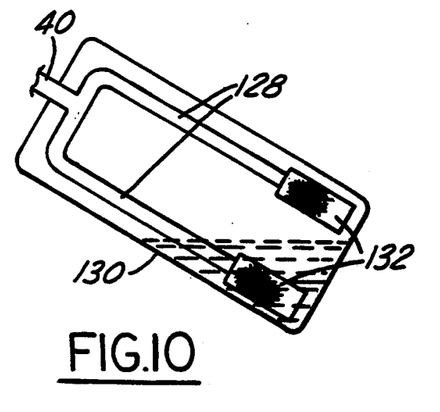
FIG. 10 is a diagrammatic view illustrating fuel intake for the cutting head of the apparatus according to the invention.

Referring now to FIG. 10, the end part 128 of pipeline 40 is shown entering a source 130 of the liquid fuel. End part 128 used for making pervious porous element for the whole dimension of the fuel source reservoir with an overall dimension of about 1 m. The capillary pressure in pores measuring 10 μm and filled with a liquid fuel (kerosene, gasoline or ethyl/methyl alcohol, etc.) wetting walls of the porous material would amount, in accordance with the above equation for $P_c$, to more than 0.1 atmosphere or more than 1 m high water (or kerosene) column. Consequently, if the pervious element placed in the fuel source reservoir is about 1 m high or long, there will be ensured intake of the liquid, down to full emptying of the reservoir. Proper fuel intake will be secured with the ratio of pore diameter to maximal overall dimension of the pervious element being in the range of $5-30 \times 10^{-6}$.

The coolant source can be formed as a transportable reservoir or cage which the fuel source (and possibly the oxidizer source), and power supply (in case of backpack design for rescue services, for example) can be mounted on. It may be, e.g., tubular cage formed as a radiator to be cooled in a natural way or forcibly.

In operation, the coolant is supplied over one of pipelines 52 or 54 into torch tip inner space 42. Upon uncovering first 56 and second 58 flow control elements on pipelines 38 and 40, the propellant components come: the oxidizer, e.g. gaseous oxygen, enters mixer inner space 30 through opening 34; the fuel, e.g. kerosene or gasoline or ethyl/methyl alcohol, passes to third flow control element (electric valve 62). After depressing starting element 62 (the button with the clamp), electric control signals from control unit 64 operate spark plug 60 (over high voltage cable 70) and electric valve 62.

The delay element provides turning valve 62 on somewhat later than firing the spark plug. The fuel arrives into mixer is split into two branches, and each of them is provided on its end with a pervious element 132. Element 132 can be in the form of a porous cylinder or a perforated cylinder, the perforations of which are covered with, for example, wire gauze net. The described arrangement provides for liquid fuel supply in cases of mounting the liquid fuel source inclined, or its falling, or inclination when transported including backpack design of the fuel supply system. A capillary pressure $P_c$ develops in capillary holes of the pervious elements that holds the liquid within the same. The value of the capillary pressure is defined by the following known relationship:

$$P_c = 4\sigma \cdot \cos\Theta / d_p,$$

where
- $\sigma$, $\Theta$—surface tension coefficient and contact angle of wetting of the liquid, respectively,
- $d_p$—hydraulic diameter of the pervious material capillaries (diameter of pores).

Until pressure difference between liquid in the pervious element and gas (such as air in the partly emptied fuel reservoir) exceeds $P_c$, a continuous (without gaseous inclusions) liquid fuel intake to the burner will be secured. The main component of that difference is hydrostatic pressure difference $$\Delta P_h = \rho g H,$$

where
- $\rho$—liquid density,
- $g$—free fall acceleration (9.81 m/s$^2$),
- $H$—in the given position of the liquid surface, the height from the upper point (or their population) of the pervious element to the liquid surface.

Specifically, the commercially available wire gauze net (of serge and plain weave), with pore diameter of 10 μm can be inner space 30 through opening 36, the oxidizer and the fuel get mixed with each other, interact with spark plug 60, and the spark discharge ignites the propellant mixture. Since the oxidizer is let in before the fuel, it rules out the possibility of accumulating the fuel in the torch tip (at the torch tip inner surface, for example), and of exploding the cutting head. In other words, it is the first portion of the propellant mixture that is set to fire, therefore nonburnt fuel cannot find the way to the torch tip inner space and get accumulated therein. Experiments show that the ignition occurs beyond the mixer, not far from its face, and the flame front reaches the "steady" state at some distance from the mixer face. The flame front does not penetrate into the mixer since the mixer outlet section is the minimal one and the propellant mixture speed therethrough is higher than the speed of the flame front propagation.

The propellant mixture burns up in combustion chamber 24, acquires kinetic energy in nozzle 26 and flows out of it into ambient air. More specifically, in combustion chamber 24, the fuel (fuel drops, to be precise) is getting volatilized, the fuel and oxidizer component mixture is heating up to the stable combustion temperature and burning up, that is converting into high temperature gaseous combustion products brought up to supersonic speed in nozzle 26. The combustion proceeds at the pressure elevated beyond ambient one, which results from both the propellant components themselves arriving compressed and heat release accompanying the combustion thereof in chamber 24. Nonoverwidened, high temperature supersonic jet interacts with the material and executes cutting or working the same.

It has been found analytically and experimentally that for the kerosene-oxygen propellant mixture, the following ratios can be recommended for working according to the present invention:

| material | v/a | $T_c/T_m$ | $\alpha$ |
|---|---|---|---|
| aluminum | 2.4 ÷ 2.8 | 3.2 ÷ 3.5 | 0.5 ÷ 0.6 |

| material | v/a | $T_c/T_m$ | a |
|---|---|---|---|
| pig iron | 2.4 ÷ 3.0 | 1.7 ÷ 1.9 | 3.0 ÷ 3.4 |
| low-carbon steel | 2.4 ÷ 2.6 | 1.3 ÷ 1.4 | 4.7 ÷ 4.9 |

Figure 3:
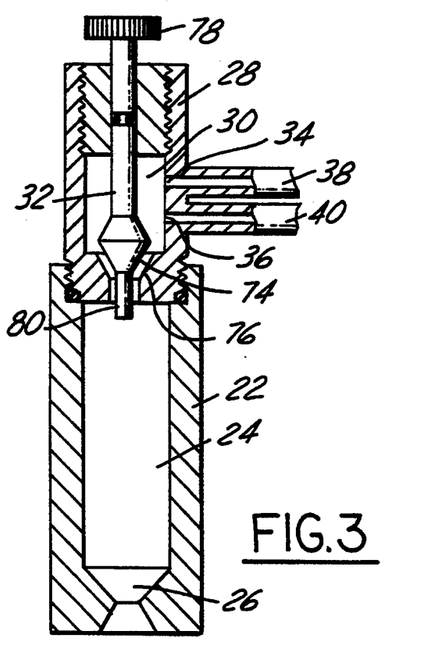
FIG. 3 is a diagrammatic sectional view of a modified embodiment of the cutting head according to the invention, with the contoured central body and combustion chamber.

Referring now to the embodiment shown in FIG. 3, the propellant components arrive at mixer inner space 30 to get mixed, they interact with central body 32, and pass through the mixer outlet section formed by contoured parts 74 and 76 of the central body and the subtending area of the mixer inner space. Then, the resulting propellant mixture comes into combustion chamber 24 and runs out of it through the nozzle. The propellant mixture is ignited, and a torch is formed burning outside torch tip 22. With the aid of manually operated (rotated) drive 78, central body 32 is displaced to reduce the hydraulic diameter of the mixer inner space, thereby diminishing the propellant mixture flow rate and the speed of getting it out. At the moment the speed of the mixture components running out becomes less than the speed of the flame front propagating, the torch is pulled into combustion chamber 24. After that, oppositely directed shifting of the central body with the help of the drive increases the hydraulic diameter of the combustion chamber back to a nominal value.

Figure 4:
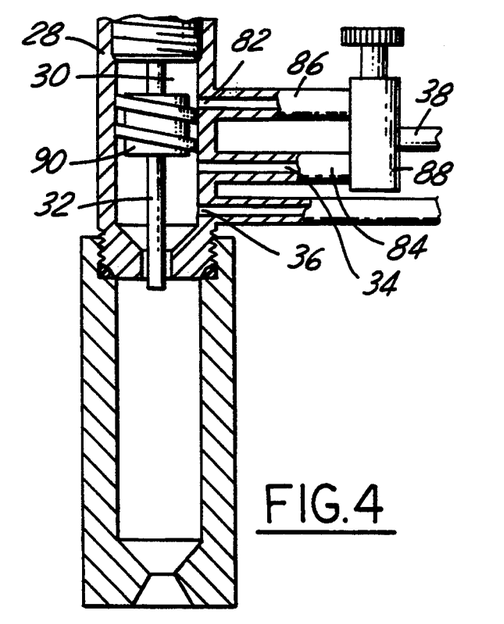
FIG. 4 is a diagrammatic sectional view of one more embodiment of the cutting head according to the invention, with an additional opening for oxidizer delivery and a switch.

Turning now to the embodiment presented in FIG. 4, pulling the flame into the combustion chamber is effected as follows. Flow direction switch (angle cock) 88 is put to the position where oxygen arrives into mixer inner space 30 going over pipeline 38, tube 86 between switch 88 and additional inlet opening 82, and through the very opening 82. Passing swirler (auger) 90, oxygen acquires rotary motion, thereby forming vortex in the central part of the nozzle for the component mixture flowing out of the nozzle. The vortex communicates the combustion chamber with ambient air, and by means of this vortex, the flame enters the combustion chamber. The central body, occupying the mixer minimal outlet section, prevents the flame front from penetrating into the mixer inner space. Then, angle cock switches supply of oxygen into the mixer from opening 82 to opening 34 thus by-passing oxygen around the swirler. The apparatus moves into the operating condition.

For firing the apparatus which is the embodiment shown in FIG. 6, movable element 98 equipped with auger 102 and placed into the longitudinal passage inside central body 32 is brought out of the central body down to the position in which auger 102 enters contoured portion 76 of the mixer inner space. Thus, the necessary geometry for imparting rotary motion to the propellant components is established. Then, with the aid of flow control elements 56, 58, the fuel and the oxidizer are let in the mixer inner space where they interact with the auger, get mixed, and acquire rotary motion. Subsequent mechanism of firing the propellant mixture and pulling the flame into the combustion chamber is similar to that described in connection with FIG. 4.

It should be noted that upon entering contoured area 76, auger 102 changes the flow section in such a way that the propellant mixture outflow speed exceeds the flame front propagation speed. After the flame has been pulled into the combustion chamber, movable element 98 is returned into central body 32. Continuation 98' of the movable element, in cooperation with the mixer minimal outlet section, again contributes to the mixer outflow speed exceeding the flame front penetration speed. It should also be appreciated that upon increasing the flow section at the mixer oulet, mass flow rate of the propellant components increases as well providing the necessary propellant mixture speed.

To use the apparatus of the present invention under water, compressed gas (compressed air, in the simplest case) is to be supplied which forms an air bubble pushing water aside, cooling the torch tip, and lowering tip outlet backpressure due to the effect of injection. Oxygen is delivered to the burner. Resulting from supply of either oxygen or compressed air to protective element 104, blank cover 106 of the protective element moves away. Then, firing of the burner is executed in the order defined by the specific embodiment of the apparatus.

The injection of the torch tip inner space provides for lowering of the operating pressure in the burner which in turn contribute to simplifying delivery of the propellant components and firing the apparatus. The protective element keeping water away from the inner space, prevents salts from precipitating into the burner, first of all onto openings for fuel and oxidizer delivery.

While several embodiments of the present invention have been disclosed hereinabove, it is to be understood that these embodiments are given by example only and not in a limiting sense. Those skilled in the art may make various modifications and additions to preferred embodiments chosen to illustrate the invention without departing from the spirit and scope of the present contribution to the art. For example, different propellant components might be chosen and various shapes of and materials for the central body used. Accordingly, it is to be realized that the protection sought and to be afforded hereby shall be deemed to extend to the subject matter claimed and all equivalence thereof fairly within the scope of the invention.

What is claimed is:

1. Torch apparatus for working a material using a high energy high temperature gaseous jet, comprising
a cutting head including means for mixing a fuel and an oxidizer flows delivered to said cutting head into a propellant, said mixing means having a first housing with top, side and bottom walls, defining a substantially cylindrical inner space thereof, with an outlet formed in said bottom wall; torch means for combusting said propellant, said torch means having a second housing defining a combustion chamber therein, said combustion chamber being connected with an ambient medium through a nozzle formed in said second housing and subtending said outlet, said inner space being connected with said combustion chamber through said outlet; and controlling means for affecting said combusting, said controlling means including a central body axially installed in said inner space and sealingly secured in an opening in said mixer housing top wall, to thereby affect thermodynamic parameters of said fuel, oxidizer and propellant flow and modify said jet;
means for delivering said fuel to said cutting head; and
means for delivering said oxidizer to said cutting head;
said inner space being connected with said fuel delivery means and said oxidizer delivery means through first and second openings in said mixer housing respectively, said first opening being formed in said side wall of said mixer housing and located downstream with respect to said second opening;

the ratio of the hydraulic diameter $d_{h\text{-}fo}$ at the outlet of said first opening into said inner space to the hydraulic diameter $d_{h\text{-}mis}$ of a flow section of said inner space at the level of the introduction of said fuel into said inner space being within the range of 0.03 to 0.5, where the hydraulic diameter $d_h$ is defined as $d_h=4S/P$, where S is flow section area of a passage, and P is a wetted circumference thereof.

2. The apparatus according to claim 1, further providing a control unit and a controllable flow control element and wherein said means for delivery said fuel to said cutting head includes a fuel delivery pipeline, said controllable flow control element being installed on said pipeline to command fuel delivery therethrough, whereas said central body includes an electric spark plug, and said control unit includes a starting element and an element of delay, said starting element being connected with said spark plug to fire the same, and said element of delay being connected to said controllable flow control element to postpone turning thereof on relative to said firing of said spark plug.

3. The apparatus according to claim 2, wherein said spark plug includes a hollow central electrode operatively connected with a source of an oxidizer.

4. The apparatus according to claim 1, wherein said central body has an end outwardly projecting from said housing and adapted to be externally driven, the surface of said central body and the surface of said mixer inner space being contoured to ensure changing of hydraulic diameter of said inner space in flow sections downstream in respect to said first opening upon a displacement effected by said external drive.

5. The apparatus according to claim 1 wherein said central body comprises a movable element adapted to be externally longitudinally displaced out of said central body, the surface of said movable element and the surface of said mixer inner space being contoured to ensure changing of hydraulic diameter of said inner space in flow sections downstream in respect to said first opening upon said external longitudinal displacement.

6. The apparatus according to claim 1 wherein said central body comprises a movable element adapted to be externally longitudinally displaced out of said central body, the surface of said movable element having a whirling means imparting rotation to the propellant components.

7. The apparatus according to claim 6 wherein said whirling means includes an auger.

8. The apparatus according to claim 1, wherein an additional opening for delivery of said oxidizer is formed in said first housing, said additional opening being located upstream relative to said second opening, and further comprising a means for switching a flow of said oxidizer between said second and said additional oxidizer delivery openings, whereas said central body is provided with a whirling means thereon located longitudinally and substantially between said second and said additional oxidizer delivery openings.

9. The apparatus according to claim 8, wherein said whirling means includes an auger.

10. The apparatus according to claim 1, wherein said central body is formed with a longitudinal passage therethrough, said passage being operatively communicated with said oxidizer delivery means.

11. The apparatus according to claim 1, wherein said mixer inner space is formed with varying flow section, the minimal flow section being at the outlet section thereof.

12. The apparatus according to claim 11, further comprising a pervious insert placed at said minimal flow section.

13. The apparatus according to claim 1, wherein the surface of said central body is formed with turbulizing elements thereon.

14. The apparatus according to claim 1, wherein the surface of said mixer inner space in sections downstream relative to the first opening section is formed with turbulizing elements thereon.

15. The apparatus according to claim 1, wherein said second housing is provided with at least one channel in side walls thereof, said channel being in fluid communication with a source of a coolant.

16. The apparatus according to claim 15, wherein said at least one channel is open from the face side of said second housing.

17. The apparatus according to claim 15, wherein said coolant source is provided with a heat transfer element, said coolant being directed from said channels through said heat transfer element and contacting said fuel and oxidizer delivery means.

18. The apparatus according to claim 1, further comprising a protective element outwardly covering the nozzle opening and connected with a source of a positive pressure controlling uncovering said opening.

19. An apparatus for forming a high temperature high energy gaseous jet using fuel and oxidizer propellant components which are mixed and ignited, said jet acting as a tool for torch working a material including cutting operations; said apparatus comprising:

a cutting head including a torch tip and a mixer;

pipelines for fuel and oxidizer delivery from their respective sources, said pipelines being provided with respective flow control means, said mixer including a housing defining a first inner space in said cutting head, said torch tip defining a second inner space in said cutting head, said mixer being provided with openings connecting said first inner space with said pipelines, said first inner space communicating with said second inner space, said openings being disposed in said mixer housing at different levels with respect to the flow of said propellant components, said opening for fuel delivery being located in said mixer housing side wall downstream relative to said opening for oxidizer delivery, the ratio of the hydraulic diameter $d_{h\text{-}fo}$ at the outlet of said first opening into said mixer inner space to the hydraulic diameter $d_{h\text{-}mis}$ of a flow section of said mixer inner space at the level of introducing said fuel into said mixer inner space being chosen within the range of $$d_{h\text{-}fo}/d_{h\text{-}mis}=0.03\text{--}0.5,$$

wherein the hydraulic diameter $d_h$ is defined as $d_h=4S/P$, where S is flow section area of a passage, and P is wetted circumference thereof;

and a central body axially secured in said mixer inner space, one end of said central body projecting out of said cutting head and externally controlled, to command thermodynamic parameters of the flow of said propellant mixture.

20. The apparatus according to claim 19, further comprising a pervious porous element attached to the end of fuel pipeline connected to a fuel reservoir, said pervious porous element being located in said reservoir and the ratio of pore diameter to maximal overall dimension of said porous pervious element being in the range of $5-30 \times 10^6$.

21. The apparatus according to claim 19, further providing a control unit and a controllable flow control element, said controllable flow control element being installed on said fuel delivery pipeline to command fuel delivery therethrough, whereas said central body includes an electric spark plug, and said control unit includes a starting element and an element of delay, said starting element being connected with said spark plug to fire the same, and said element of delay being connected to said controllable flow control element to postpone turning on thereof relative to said spark plug firing.

22. The apparatus according to claim 21, wherein said spark plug includes a hollow central electrode operatively connected with a source of an oxidizer.

23. The apparatus according to claim 19, wherein third opening for delivery of said oxidizer is formed in said mixer housing, said third opening being located upstream relative to said second opening, and further comprising means for switching a flow of said oxidizer between said second and third openings, whereas said central body is provided with whirling means thereon located longitudinally and substantially between said second and said third openings.

24. The apparatus according to claim 23, wherein said whirling means includes an auger.

25. The apparatus according to claim 23, wherein said switching means includes an angle cock.

26. The apparatus according to claim 19, wherein said central body is formed with a longitudinal passage therethrough, said passage being operatively communicated with said oxidizer pipeline.

27. The apparatus according to claim 19, wherein said mixer inner space is formed having varying flow section, the minimal flow section being at the outlet section thereof.

28. The apparatus according to claim 19 wherein said central body comprises a movable element adapted to be externally longitudinally displaced out of said central body, the surface of said movable element having an auger imparting rotation to the propellant components.

29. The apparatus according to claim 19, wherein said torch tip is provided with channels in side walls thereof, said channels being in fluid communication with a source of a coolant.

30. The apparatus according to claim 29, wherein said source of said coolant includes an element for transporting said fuel source.

* * * * *

UNITED STATES PATENT AND TRADEMARK OFFICE
CERTIFICATE OF CORRECTION

PATENT NO. : 5,385,336

DATED : January 31, 1995

INVENTOR(S) : Alexander V. Gurinov; Vladimir N. Kostritsa; Igor' V. Petrov; Valeryi F. Sukhostavets It is certified that error appears in the above-indentified patent and that said Letters Patent is hereby corrected as shown below:

Column 15, line 7, please delete "$5-30 \times 10^6$" and insert --$5-30 \times 10^{-6}$--

Signed and Sealed this

Fourth Day of April, 1995

Attest:

BRUCE LEHMAN

*Attesting Officer*   *Commissioner of Patents and Trademarks*